United States Patent [19]

Drummond

[11] Patent Number: 4,916,525

[45] Date of Patent: Apr. 10, 1990

[54] HIGH DEFINITION TV SYSTEM

[75] Inventor: J. E. Drummond, Oceanside, Calif.

[73] Assignee: Hughes Aircraft Company, Los Angeles, Calif.

[21] Appl. No.: 237,807

[22] Filed: Aug. 29, 1988

[51] Int. Cl.⁴ .................... H04N 11/00; H04N 7/87
[52] U.S. Cl. ........................................ 358/12; 358/141
[58] Field of Search .................................. 358/12, 141

[56] References Cited

U.S. PATENT DOCUMENTS 4,707,728 11/1987 Hurst ..................................... 358/12

FOREIGN PATENT DOCUMENTS 505653 5/1939 United Kingdom .................. 358/15

OTHER PUBLICATIONS

Jurgen, High-Definition Television Update, IEEE Spectrum, vol. 25, No. 4, pp. 56-62, Apr. 1988.
Brody, The Push for a Sharper Picture, High Technology Business, vol. 8, No. 4, pp. 25-29, Apr. 1988.
Drummond et al., Final Report on ACMP Data Compression, Hughes Aircraft, Support Systems, Dec. 1985 to Oct. 1987.

*Primary Examiner*—John W. Shepperd
*Attorney, Agent, or Firm*—Wanda Denson-Low; Charles D. Brown

[57] ABSTRACT

A high definition television system is disclosed. The transmitter 10 of the invention compresses image data and transmits the compressed data during the vertical flyback interval of a standard NTSC television signal. The receiver 30 of the invention decompresses the compressed image data and adds the expanded lines of data to normal image data in interlineal fashion. In a specific embodiment, an improvement operator 58 is utilized to expand the data and fill in missing pixels. The output of the improvement operator 58 is stored in a memory 56 which is then scanned in a non-interlaced mode for presentation.

12 Claims, 4 Drawing Sheets

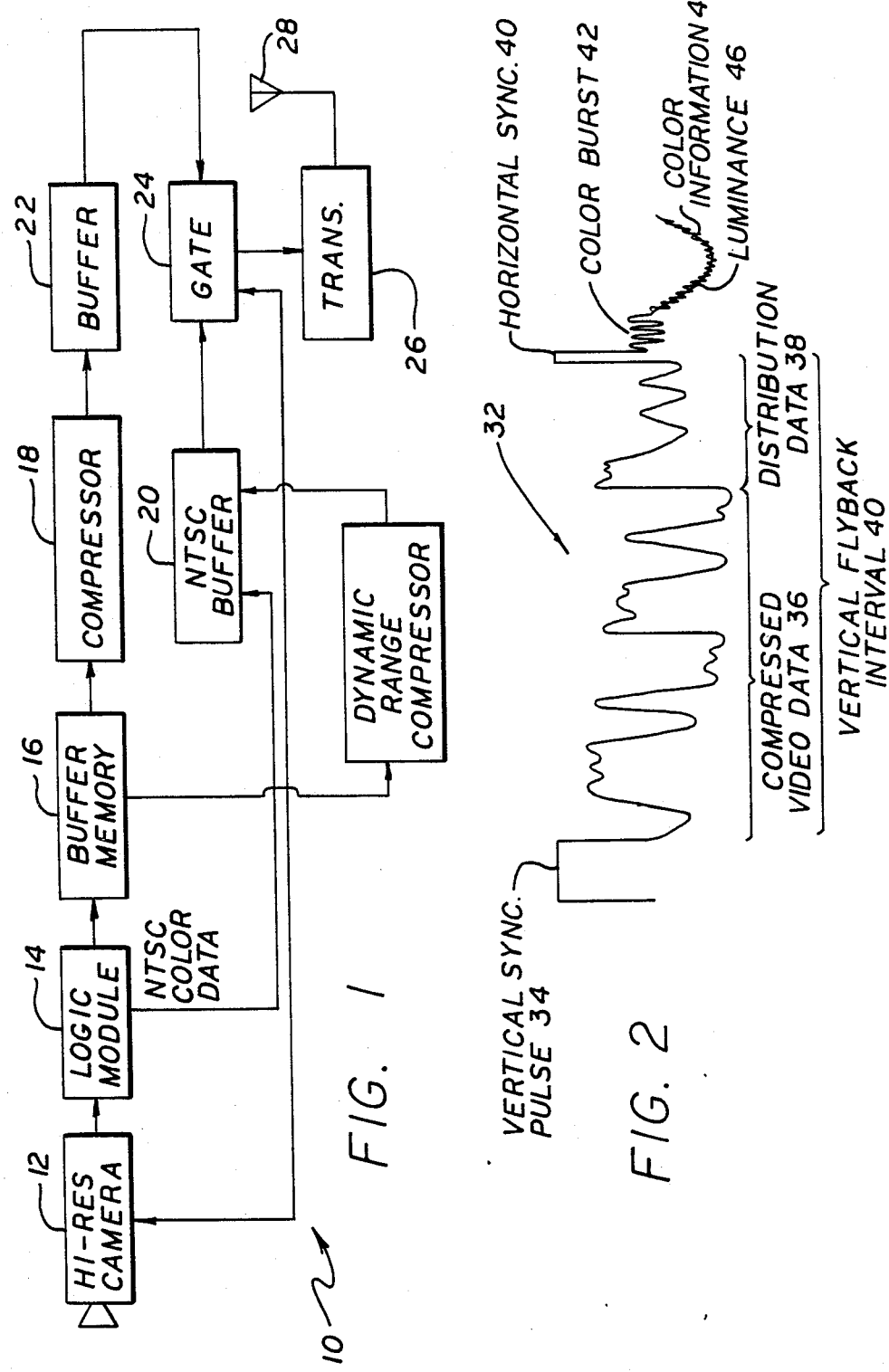

HIGH DEFINITION TV SYSTEM

BACKGROUND OF THE INVENTION

1. Field of the Invention:

The present invention relates to television systems. More specifically, the present invention relates to systems for transmitting and receiving high definition television signals.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Conventional television systems are characterized by 525 horizontal scan lines and a 4:3 screen width to screen height (aspect) ratio. As discussed in a side article in "High-definition television update" by Ronald K. Jurgen, in the April 1988 issue of *IEEE Spectrum*, vol. 26, no. 4, pp. 56–62, in 1941, the Federal Communications Commission (FCC) adopted the National Television System Committee (NTSC) standard for the transmission of black and white television. It also allocated space for commercial television. In 1953, the NTSC standard was modified to add color information. In 1984, it was modified again to add stereo sound information. Although the standard has served the public well for nearly 50 years, certain defects limit its audio and video quality. Some of the defects are inherent, but others are the result of adding color information to the transmitted signal without increasing its bandwidth. In describing the defects, the FCC noted that viewers obtain a greater sense of realism and involvement, as well as an illusion of depth, not just from a better picture, but from a wider display, one that is a better match to the dimensions of the human field of vision than the 4:3 aspect ratio of conventional television systems. Further, the limited horizontal, vertical, and luminance resolutions of NTSC television results in pictures that are less sharp and bright than in movie theaters, while audio quality is limited in comparison with the sound produced by today's compact disks. Television viewing conditions usually limit contrast intensity ratios to about 60:1 even though about 250:1 may be transmitted.

Thus, a new standard for audio and video television is being considered. This promising new standard is referred to as high definition television or HDTV. High definition television is characterized by 900 to 1200 horizontal scan lines, more resolution across each scan line, and an aspect ratio of approximately 5:3. Hence, high definition television systems will provide as much as 5 times more visual information. The resulting video image quality is expected to be as good as that obtained from 35 mm film, while the resulting audio is expected to be as good as that obtained from digital audio disks.

While there are many current proposals for HDTV, there are also many problems. Terrestrial transmission, i.e., excluding cable and satellite transmission, is currently limited in bandwidth by the NTSC standard. That is, a single NTSC channel currently occupies only 6 megahertz of bandwidth while some HDTV proposals would require as much as 10 megahertz per channel. Adoption of such proposals for the HDTV standard would require the FCC to reconfigure the American broadcasting spectrum. This may require many TV owners in the United States, Canada, Japan and Latin America to buy a new and probably expensive TV set.

As discussed in "The Push for a Sharper Picture" by H. Brody, in the April 1988 issue of *HIGH TECHNOLOGY BUSINESS*, vol. 8, no. 4, pp. 25–29, some proposed systems are compatible with existing NTSC television sets. Unfortunately, these systems either do not provide a quality HDTV system or require additional channels or are exceedingly expensive for the average consumer.

Hence there is a need in the art for an inexpensive, bandwidth conservative high definition television system which is compatible with the present NTSC standard.

SUMMARY OF THE INVENTION

The need in the art is addressed by the high definition television system of the present invention. The transmitter of the invention compresses image data and transmits the compressed data during the vertical flyback interval of a standard NTSC television signal. The receiver of the invention decompresses the compressed image data and adds the expanded lines of data to normal image data in interlineal fashion. In a specific embodiment, an improvement operator is utilized to expand the data and fill in missing pixels. The memory is then scanned in a non-interlaced mode for presentation. An additional 33% of horizontal resolution information is provided by re-organizing the dynamic intensity range from the current available ratio of about 250:1 to 60:1 which is experienced in conventional television receiver settings. The extra information, 2 bits per pixel, is used to provide an extra pixel from three successive pixels.

BRIEF DESCRIPTION OF THE DRAWINGS

FIG. 1 shows an illustrative implementation of a preferred embodiment of the transmitter section of the high definition television system of the present invention.

FIG. 2 illustrates the high definition television signal transmitted and received by the high definition television system of the present invention.

DESCRIPTION OF THE INVENTION

Figure 4A:
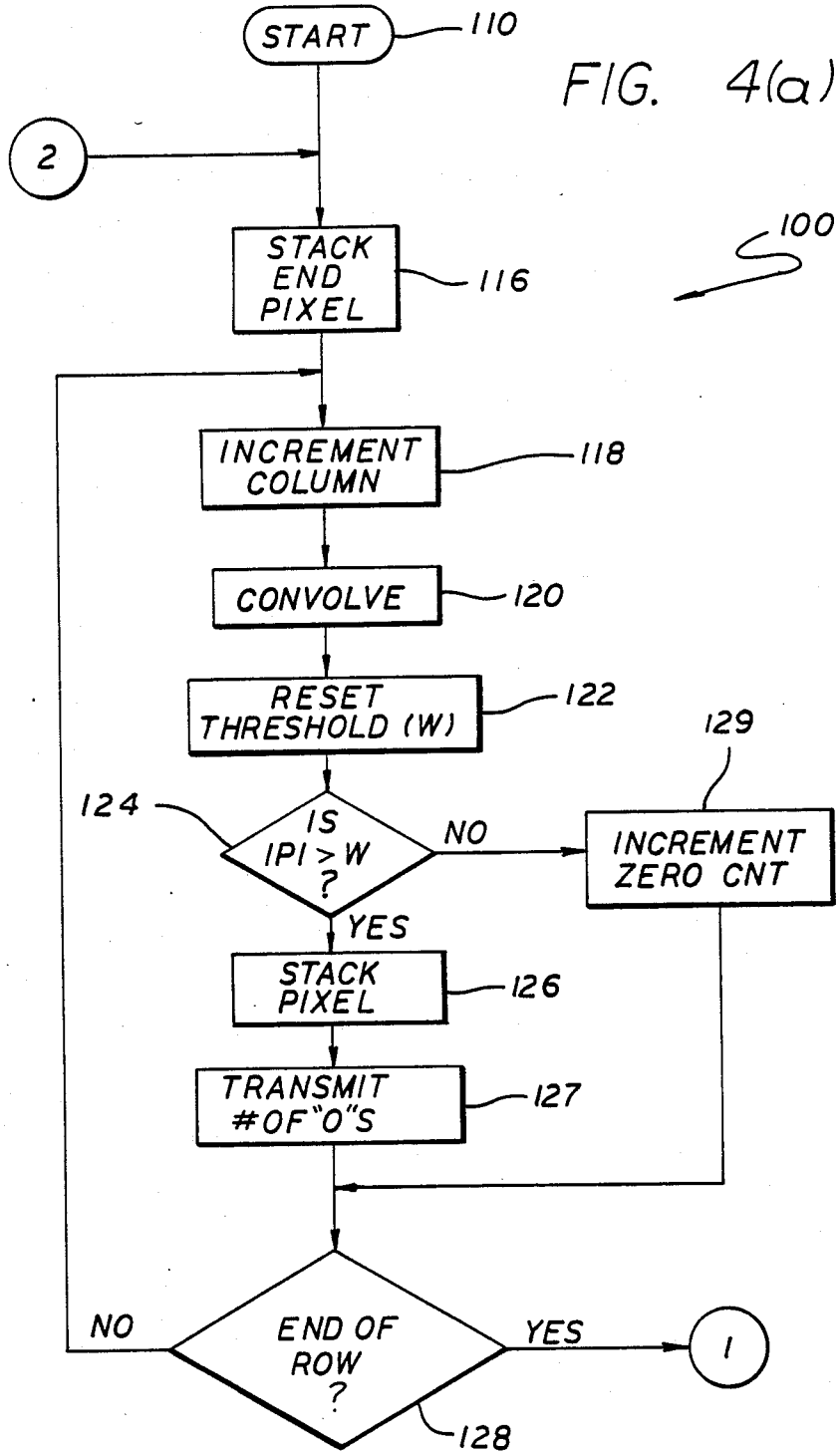
FIGS. 4(a) and 4(b) provide a flow diagram of an illustrative implementation of the compression scheme utilized in the preferred embodiment of the present invention.

As is known to those skilled in the art, the bandwidth of the luminance signal of a conventional NTSC standard television is 3 MHz, while that containing hue and saturation information is the chromance signal which occupies only 1 MHz. The color information is of very low resolution. It is made crisp and sharp on the screen by the eye as well as conventional circuitry using the intensity edges within the luminance signal to sharpen the color edges. In the conventional NTSC standard TV system, a vertical flyback signal occurs twice each frame. Once for each set of 240 interlaced lines. (The term "vertical flyback" refers to the movement of the scanning beam of a television from one point on the screen, typically the bottom, to another, typically the top.) After 240 lines of display, 22.5 lines of time are consumed for vertical flyback which initiates a second interlaced field. Altogether, 45 lines of time are virtually empty, about 10 percent of the video bandwidth. This vacant region has recently been used for text for the deaf and for newspaper printing. The present invention utilizes this vacant region and can share this region with such other services.

In the preferred embodiment, the present invention compresses 480 lines of additional video luminance information into the 45 lines of flyback time. Ordinary receivers will simply ignore this information and the text services can use the space as at present whenever high definition TV is not being broadcast. The new even numbered lines share the color information of the adjacent original, odd numbered, lines allowing an extra megahertz of unused color carrier for the even numbered lines. This unused band is used by the present invention to provide 33 percent more luminance information per even line matching the 33 percent increase provided by the dynamic range compression of the odd numbered lines. Hence, the present invention enhances horizontal as well as vertical resolution.

The high definition television system of the present invention includes a transmitter section 10 and a compatible receiver section 30. An illustrative implementation of the transmitter section 10 is provided in FIG. 1. The transmitter section 10 includes a conventional high resolution camera 12 or other suitable source of high definition TV data. Image data from the camera 12 is provided to a logic module 14. The logic module 14 digitizes the image data and distributes the data into a buffer memory 16. In the preferred embodiment, the intensity of each pixel is represented by one byte (8 bits) of data. The logic module 14 may be implemented by a microprocessor or discrete logic in a manner known to those of ordinary skill in the art. The buffer memory 16 may be implemented as a dual port memory to facilitate simultaneous read/write operations. In any event, a compressor 18 samples all lines in the buffer memory 16 and puts compressed information in the buffer 22. This sparse data together with the full data from odd numbered lines will later be used to reconstruct the even numbered lines. The compressor 18 works on adjacent pixels of the complete picture to derive compressed data for the even numbered lines. The compressor 18 may also be implemented by a microprocessor capable of executing a suitable compression algorithm. In the preferred embodiment, the compressor 18 performs a Laplacian operation on the data such that P of equation 1 below is found:

$$del^2 I = P \quad [1]$$

where I represents the intensity of each pixel of image data.

The compressor 18 next thresholds the P data and outputs a "0" if the threshold is not exceeded and 1/16 of the value of the pixel, roughly proportional to the intensity thereof, if the threshold is exceeded. Those skilled in the art will recognize that a preponderance of zeros will be output resulting in a compact coding scheme. The rough proportionality only 4 bits instead of 6 or 8, would create artificial abrupt intensity edges in the reproduced image except that the reconstruction process smoothly fills in between the transmitted pixels. Thus abrupt continuous edges are inhibited though isolated abrupt pixels may occur. Finally, the 4 bit pixels are stacked to 8 bit bytes and output to the buffer 22. The distribution of zeros is run length coded and placed at the end of buffer 22.

In the dynamic range compressor 17, the lower two bits of sequences of three 8-bit pixels of the odd numbered lines are replaced in sequence by the first, second, and third pairs of bits from the fourth pixel following the sequence of three pixels. Thus the number of pixels in the line will be reduced to ¾ of the number produced by the high definition TV camera and stored in buffer 20. These remaining pixels will be compatible with the present NTSC standard. Their lower two bits will not be noticed in usual TV lighting conditions but will be re-assembled in new receivers (equipped with the system of the present invention) to produce lines approximately 33% longer than the NTSC standard. The modulated color carrier will be added to the intensity data in buffer 20 to complete the NTSC standard video signal. Thus, the NTSC buffer 20 stores typical NTSC like data (e.g. 480 lines) and the buffer 22 stores decimated or compressed data (480 lines) along with distribution data which provides information on the distribution of the compressed data and zeros along the even-numbered lines. A gate 24 with associated logic scans each of the buffers 20 and 22 and outputs to a conventional television transmitter 26, with associated antenna 28, a signal of the form shown in FIG. 2.

As shown in FIG. 2, the transmitted signal 32 resembles a conventional NTSC signal with the exception that the transmitted signal 32 of the present invention consists of an abbreviated vertical flyback synchronization (sync) pulse 34 followed by two files, one including the compressed (decimated) video data 36 and the other including the distribution data 38. These files are included during what would otherwise be the vertical flyback interval 40. The decimated data is data from which the redundant data has been removed by the transmitter section 10. The distribution data is a run-length code establishing the placement of the decimated pixels. The remainder of the transmitted signal 32 is a standard NTSC color waveform, inverted so that black is up. It consists of a horizontal sync pulse 40 followed by a color burst signal 42. The horizontal sync pulse is a large positive pulse which initiates blanking of the horizontal retrace line. The color burst signal 42 typically starts a ringing oscillator and provides a phase reference for the detection of the color subcarrier signal 44 which rides on the slowly varying luminance (intensity) signal 46. As is known in the art, the phase and amplitude of the color subcarrier 44 typically provides the ratio of the red (R), green (G), and blue (B) colors while the absolute value of their sum is provided by the luminance signal 46.

Figure 3:
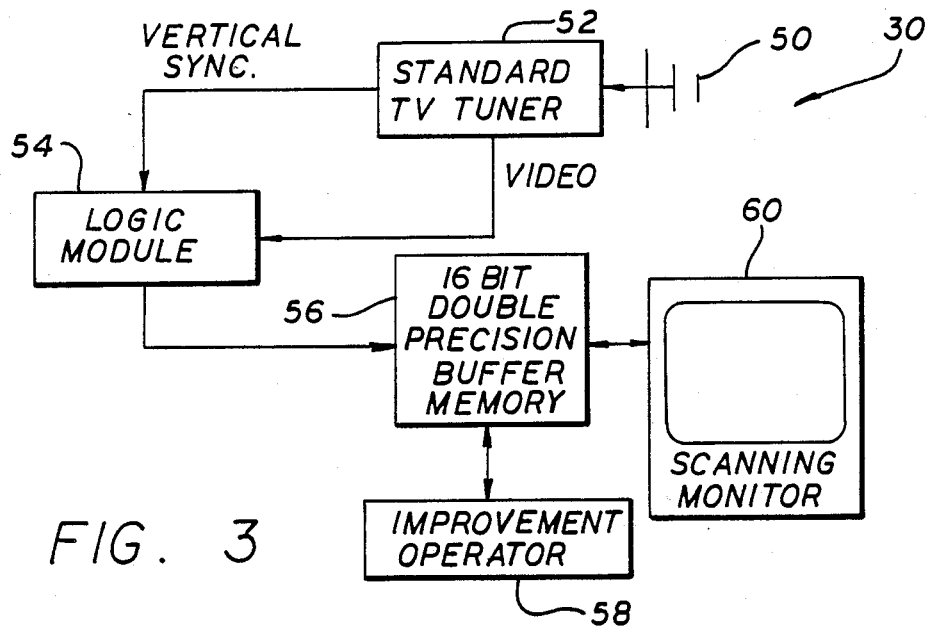
FIG. 3 shows an illustrative implementation of a preferred embodiment of the receiver section of the high definition television system of the present invention.

FIG. 3 shows an illustrative implementation of a high definition television receiver 30 designed in accordance with the principles of the present invention to decode and utilize the high definition information provided by the transmitter 10 of the form of that shown in FIG. 2. The signal is received by a conventional antenna 50 and processed by a standard TV tuner 52. The tuner 52 provides the vertical sync signal to logic module 54 with the video signal. The logic module 54 uses the video sync signal and the distribution data to distribute the video data into a double precision buffer memory 56. The run length code in the distribution data is used by the logic module 54 to establish the placement of the decimated pixels. The odd numbered lines are expanded by assembling the lowest two bits of three successive pixels into a fourth, 6 bit pixel. Then the odd row pixels are shifted so that their most significant bits reside at bit 13 of the 1-16 bits of the double precision buffer. These lines of video are then written into the memory 56 in interlineal fashion with a one line per line offset or space. The logic module 54 splits the decimated video from the original video and normalizes it by multiplying it by 16. The distribution data 38 sets the normalized even line pixels into their proper places in buffer 56 filling the remaining positions in the even line with average values from nearby normalized pixels. The logic module 54 may be implemented by discrete logic or by a microprocessor as is known in the art. For example, those of ordinary skill in the art will recognize that the logic module could be implemented with an analog-to-digital converter to digitize the input video signals and a counter and shift register to develop addresses for random access memory of the memory 56 from the vertical sync pulses. Data in the buffer memory 56 is operated on by an improvement operator 58, which in the preferred embodiment, includes a microprocessor utilizing a Poisson picture processing (PPP) algorithm. The Poisson picture processing algorithm is known in the art. See the final report on ACMP DATA COMPRESSION by the Hughes Aircraft, Support Systems by J. Drummond, J. McWaid, F. Lin, and K. Dubbs, December 1985 to October 1987. The invention is not limited to the use of any particular algorithm or technique used to decompress the data. Those skilled in the art will recognize other such decompression techniques as may be suitable for a particular application. The improvement operator solves the homogeneous form of equation 1 above for the intensity values between normalized pixel data which together with pixel values on adjacent odd numbered lines provide the boundary conditions. The PPP iteration algorithm is complete after 6 iterations per frame in the preferred embodiment regenerating the missing pixels using both original data and the remaining decimated data. Data in the buffer memory 56, which may be a two port memory, is then scanned by a scanning monitor 60 for presentation in a conventional manner.

Figure 4B:
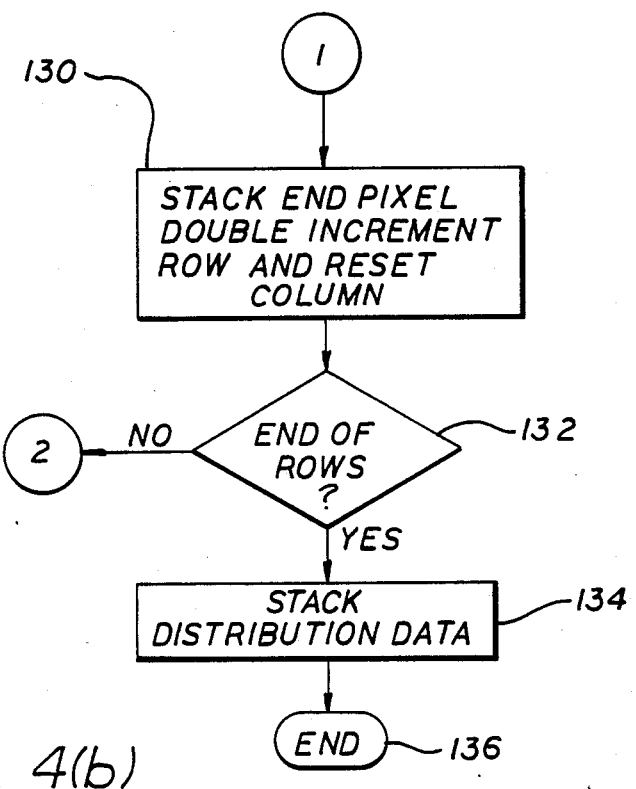

FIGS. 4(a) and 4(b) provide a flow diagram 100 of an illustrative implementation of the PPP algorithm utilized for compression of the even-numbered lines in the preferred embodiment of the present invention. The Start, 110, initiates processing of row two held in buffer 18. The left end pixel is divided by 16 and stored in the lower nibble of a byte or, on successive data coming from the loop 2, it may be stored in the upper nibble if the lower one is full. Whenever the upper nibble is filled, the byte is transferred to the storage buffer 22. The next pixel in row two is now examined. The Increment Column, step 118, increments the address to point to this pixel. The Convolve, step 120, forms the Laplacian, P of equation [1] using the current pixel and pixels left and right of the current pixel in the even-numbered row and the pixels above and below it in odd numbered rows. The threshold is computed at the Reset Threshold, step 122. The threshold is set high at first, but as the column counter is further incremented, the threshold is lowered in proportion to the column number until it is exceeded by the value of P at some column. The threshold is then re-set to its high initial value and again steadily decreased with column number. At step 124, the present magnitude of P is compared with W. If, at step 124 the magnitude of P ($|P|$) is not greater than W; then a "zero" will be counted at Increment Zero Cnt, step 129. If $|P|$ exceeds W, at step 124, the intensity at the present column is divided by 16 and stacked as the bottom nibble if available, or else the top nibble of the current data byte to be sent to buffer 22. At the Transmit Number of "Zeros" step 127, the number of zeros previously counted is sent to the distribution section of buffer 22 and the zeros counter is reset. A test is made at the End of Row, step 128, to see if the current column is the next-to-last column. If it is not, then the process described above, steps 118-128, is repeated. If the current pixel is the next-to-last pixel in the row then the right end pixel will be stacked and the row number incremented twice at Stack End Pixel Double Increment Row, step 130. If, at End of Rows, step 132, the row number is less than 960 then the process repeats from 2. Otherwise the array of distribution data is stacked in nibbles. This is possible because the run length of zeros is kept less than 16 by the threshold adjuster 122. This adjuster also sets initial thresholds so that at least one zero follows any non-zero return.

Figure 5:
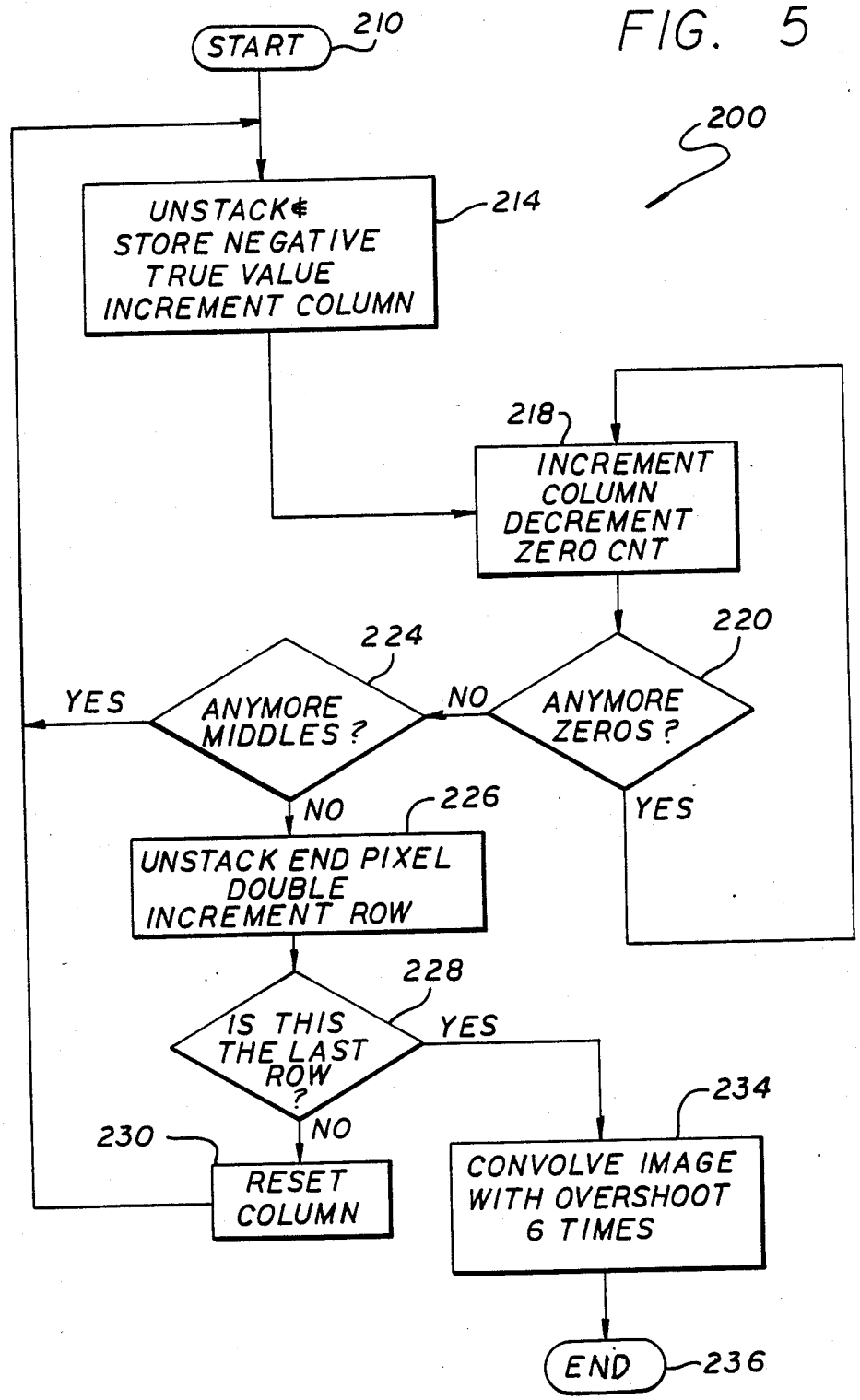
FIG. 5 is a flow diagram of an illustrative implementation of the decompression scheme utilized in the present invention.

FIG. 5 is a flow diagram 200 of an illustrative implementation of the decompression scheme utilized in the present invention. The Start, 210, initiates processing of row two data which arrives during the vertical retrace intervals and is locally stored within the logic module. The first (or next) byte is unstacked by the Unstack and Store Negative True Value Increment Column, step 214. The lower (or next) nibble is multiplied by 512 and stored in the double precision buffer 56 as the N+1 succeeding column pixel values by the Unstack and Store Negative True Value Increment Column step 214; Increment Column Decrement Zero Cnt. step 218 and Anymore Zeros step 220; where N is the first (or next) nibble value in the distribution section of the flyback data storage. The first of this array of pixels is stored as negative to mark it not to be changed later by the improvement operator. By the Anymore Middles, step 224, the column counter is compared with the maximum number of columns. If less than the maximum, the foregoing procedure is restarted, otherwise by the Unstack End Pixel Double Increment Row step 226, the nibble corresponding to the right end column is multiplied by 256 and set into the buffer 56 and the row counter is double incremented. The row counter is compared with 960 by the Is This The Last Row step 228. If the count in the row counter is less than 960, then the column counter is reset and the process restarted at the Unstack and Store step 214 as described above. Otherwise the improvement operator 58 is enabled at a Convolve Image With Overshoot 6 Times step 234. This operator contains an iterative solver of Laplace's equation (the homogeneous form of Equation [1]). This operator uses one of the many over-relaxation procedures well known in the numerical processing literature. The preferred embodiment employs a very fast form of the algorithm as fully documented in the above-referenced final report. Three double passes are sufficient for good restoration and, in the preferred embodiment, can be accomplished in 1/30 second. When this reconstruction is complete, the scanning monitor 60 is fed bits 8-13 from the buffer 56 pixels in a linear (not interlaced) pattern of all rows. The buffer 56 is a double precision buffer to speed up the operation of the improvement operator and to make it more accurate.

Thus, the present invention has been disclosed herein with reference to a particular embodiment for a particular application. Those of ordinary skill in the art will recognize additional modifications, applications and embodiments within the scope of the invention. For example, the invention is not limited to the manner by which data is written into memory. Nor is the invention limited to the techniques used to compress and decompress data. Further, the invention is not limited to a particular technique for transmitting, receiving and displaying data.

It is intended by the appending claims to cover any and all such modifications, applications and embodiments. Accordingly,

What is claimed is:

1. A high definition television system comprising:
    a source of high definition television (HDTV) video signals comprising a stream of eight bit bytes each representative of a respective pixel;
    a dynamic range compressor for receiving and reformating said HDTV video signals to provide a first video signal comprising a stream of eight bit bytes, wherein a first portion of each of three consecutive bytes contains data representative of a respective one of three pixels and a second portion of each of said three consecutive bytes contains a portion of the data representative of a fourth pixel;
    first means for transmitting a periodic vertical synchronization signal and said first video signal, said vertical synchronization signal having a flyback interval;
    second means for receiving said HDTV video signals and for transmitting a compressed video signal during said vertical flyback interval;
    third means for receiving said first video signal and said compressed video signal;
    fourth means for decompressing said compressed video signal to form a decompressed video signal; and
    fifth means for displaying said first video signal and said decompressed video signal.

2. The system of claim 1 wherein said second means includes laplacian operator means for performing a differentiation operation on said HDTV video signals to provide said compressed video signal.

3. The system of claim 1 wherein said fourth means includes means for implementing a Poisson picture processing algorithm upon said decompressed video signal.

4. A high definition television system comprising:
    a source of high definition television (HDTV) video signals;
    first means for receiving said HDTV video signals and transmitting a periodic vertical synchronization signal and a first video signal, said vertical synchronization signal having a flyback interval;
    second means for receiving said HDTV video signals and transmitting a compressed video signal during said vertical flyback interval, said second means including laplacian operator means for performing a differentiation operation on said HDTV video signals to provide said compressed video signal;
    third means for receiving said first video signal and said compressed video signal;
    fourth means for decompressing said compressed video signal, to form a decompressed video signal, said fourth means including means for implementing a Poisson picture processing algorithm upon said decompressed video signal and said first video signal; and
    fifth means for displaying said first video signal and said decompressed video signal in a combined format to form a HDTV image.

5. The high definition television system according to claim 4, wherein said first video signal comprises a stream of eight bit bytes, a first portion of each of three consecutive bytes containing data representative of a respective one of three pixels and a second portion of each of said three consecutive bytes containing a respective portion of the data representative of a fourth pixel.

6. The high definition television system according to claim 4 wherein said second means further includes a thresholding operator.

7. The high definition television system according to claim 4 wherein said fifth means displays said first video signal and said decompressed video signal in an interlaced format to form a HDTV image.

8. A method for providing high definition television transmission and reception including the steps of:
    (a) providing high definition television (HDTV) video signals comprising a stream of eight bit bytes each representative of a respective pixel;
    (b) reformatting said HDTV video signals to provide a first video signal comprising a stream of eight bit bytes, wherein a first portion of each of three consecutive bytes contains data representative of a respective one of three pixels and a second portion of each of said three consecutive bytes contains a portion of the data representative of a fourth pixel;
    (c) transmitting a periodic vertical synchronization signal and said first video signal, said vertical synchronization signal having a flyback interval;
    (d) transmitting a compressed video signal during said vertical flyback interval;
    (e) receiving said first video signal and said compressed video signal;
    (f) decompressing said compressed video signal; and
    (g) displaying said first video signal and said decompressed video signal in a combined format so as to form a HDTV image.

9. The method of claim 8 wherein said step of transmitting a compressed video signal during said vertical flyback interval includes the step of performing differentiation and thresholding operations on said HDTV video signal to provide compression of said HDTV video signal.

10. The method of claim 8 wherein said step of decompressing said compressed video signal includes the step of processing said compressed video signal using a Poisson picture processing algorithm.

11. A method for providing high definition television transmission and reception including the steps of:
    (a) providing high definition television (HDTV) video signals comprising a stream of eight bit bytes each representative of a respective pixel;
    (b) reformatting said HDTV video signals to provide a first video signal comprising a stream of eight bit bytes, wherein a first portion of each of three consecutive bytes contains data representative of a respective one of three pixels and a second portion of each of said three consecutive bytes contains a portion of the data representative of a fourth pixel;

(c) transmitting a periodic vertical synchronization signal and a first video signal, said vertical synchronization signal having a flyback interval;

(d) transmitting a compressed video signal during said vertical flyback interval, said step including the step of performing a differentiation operation on a second video signal to provide said compressed video signal;

(e) receiving said first video signal and said compressed video signal;

(f) decompressing said compressed video signal utilizing a Poisson picture processing algorithm; and (g) displaying said first video signal and said decompressed video signal in a combined format to provide a HDTV image.

12. A high definition television system comprising:

a source of high definition television (HDTV) video signals representing even and odd numbered display lines, each line comprising a stream of eight bit bytes, each byte representative of a respective pixel;

a dynamic range compressor for receiving and reformatting the odd numbered lines of said HDTV video signals to provide a first video signal comprising a stream of eight bit bytes, wherein a first portion of each of three consecutive bytes contains data representative of a respective one of three consecutive pixels and a second portion of each of said three consecutive bytes contains a portion of the data representative of a fourth pixel;

first means, having an input for receiving said first video signal, and an output for providing a periodic vertical synchronization signal and said first video signal, said vertical synchronization signal having a flyback interval;

second means, having an input for receiving said HDTV video signals, for compressing data representative of the even numbered lines by use of the Laplace operator, and threshold operator and run length coding, and an output for providing the result as a compressed video signal;

a gate having a first input coupled to the output of said first means and a second input coupled to the output of said second means, said gate providing the signal at its first input to a transmitter during a first transmit interval and providing the signal at its second input (compressed video signal) to said transmitter during said flyback interval;

third means for receiving said first video signal and said compressed video signal;

fourth means for decompressing said compressed video signal (representative of the even numbered lines) and said first video signal (representative of the odd numbered lines) said fourth means comprising a Poisson picture processing algorithm for restoring a given pixel on an even numbered line by processing (a) pixels on said even numbered line and which are adjacent said given pixel and (b) pixels immediately adjacent said given pixel and located in the adjacent odd numbered lines; and fifth means for displaying said first video signals and decompressed video signals as interlaced odd and even lines to form a HDTV image.

* * * * *